United States Patent Office 3,037,965
Patented June 5, 1962

3,037,965
WATER-INSOLUBLE HYDROLYZED COPOLYMER OF VINYLENE CARBONATE AND VINYL ACETATE
Howard C. Haas, Arlington, Mass., assignor to Polaroid Corporation, Cambridge, Mass., a corporation of Delaware
No Drawing. Filed Apr. 14, 1958, Ser. No. 728,117
1 Claim. (Cl. 260—77.5)

The present invention is concerned with high polymers and, more particularly, with substantially completely hydrolyzed, water-insoluble, homopolymers of vinylene carbonate and with substantially completely hydrolyzed, water-insoluble copolymers of vinylene carbonate and vinyl acetate.

One object of this invention is to provide substantially completely hydrolyzed, water-insoluble homopolymers of vinylene carbonate.

Another object of this invention is to provide substantially completely hydrolyzed, water-insoluble copolymers of vinylene carbonate and vinyl acetate.

Still another object is to provide suitable processes for preparing said water-insoluble polymers and copolymers.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claim.

For a fuller understanding of the nature and objects of the invention, reference should be had to the following detailed description.

Newman and Addor in the Journal of the American Chemical Society, volume 75 (1953), page 1,263, disclose processes for preparing vinylene carbonate monomer and recite that said monomer may be polymerized and the resulting polyvinylene carbonate polymer may be hydrolyzed to produce water-soluble polymers. From said teachings it would be expected that the solubility of hydrolyzed polyvinylene carbonate would be analogous to that of hydrolyzed polyvinyl acetate, i.e., the solubility of the polymers in water would increase with the degree of hydrolysis.

It has been discovered that when the hydrolysis of vinylene carbonate homopolymers and of vinyl acetate polymers comprising a mole fraction of vinylene carbonate of at least about 0.6 is continued until substantially complete hydrolysis is achieved, the hydrolysis products differ substantially and unexpectedly from the partially hydrolyzed products, previously disclosed, in that said substantially completely hydrolyzed polymers and copolymers are water-insoluble. The results are especially unexpected in the case of the vinylene carbonate-vinyl acetate copolymers wherein it would be expected that the vinyl alcohol segments would further enhance the water solubility.

The substantially completely hydrolyzed, water-insoluble, hydrolysis products of vinylene carbonate homopolymers may be characterized as polymers having repeating groups of the structure:

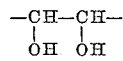

The substantially completely hydrolyzed, water-insoluble vinylene carbonate-vinyl acetate copolymers may be characterized as polymers having recurring 1,2-dihydroxyethylene

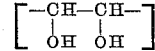

and vinyl alcohol,

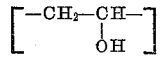

groups, wherein the mole fraction of 1,2-dihydroxyethylene groups present is at least 0.6.

The polymers of this invention may be produced by preparing vinylene carbonate polymers and vinylene carbonate-vinyl acetate copolymers, comprising the specified amount of vinylene carbonate, and substantially completely hydrolyzing the resulting polymers and copolymers. Vinylene carbonate monomer, which may be prepared by the processes disclosed by Newman and Addor in the previously mentioned Journal of the American Chemical Society article, readily polymerizes at elevated temperatures in the presence of free radical catalysts. As examples of free radical catalysts, contemplated to be useful in carrying out the polymerization, mention may be made of azo-type catalysts such as $\alpha,\alpha'$-azodiisobutyronitrile, organic peroxides, such as benzoyl peroxide, and inorganic peroxides, such as hydrogen peroxide.

The vinylene carbonate polymers and vinylene carbonate-vinyl acetate copolymers, which are used to prepare the substantially completely hydrolyzed polymers of this invention, are preferably prepared by polymerization at atmospheric pressure in a temperature range from 70° to 100° C. However, the reaction temperature and pressure may be varied to suit particular needs. The polymerization may be carried out in bulk or in suitable solvent or nonsolvent mediums (emulsion polymerization).

In preparing the vinylene carbonate-vinyl acetate copolymers, the ratio of monomer reactants should be proportioned so as to insure an initial yield of copolymer containing a mole fraction of vinylene carbonate of at least 0.6. Reaction ratios of at least 9 moles vinylene carbonate monomer to 1 mole of vinyl acetate have been found to be especially useful in this respect.

In hydrolyzing the vinylene carbonate homopolymers and vinylene carbonate-vinyl acetate copolymers to produce the substantially completely hydrolyzed polymers and copolymers of this invention, alkali metal hydroxides, such as sodium hydroxide, and alkali metal alcoholates, such as sodium methoxide, are preferably used as catalysts to bring about hydrolysis; however, other methods of hydrolysis, commonly used in hydrolyzing esters, may be employed. The hydrolysis is carried out for extended periods of time or preferably at elevated temperatures in order to insure complete hydrolysis. As the hydrolyses proceed, water-soluble polymers and copolymers, as taught by the art, are initially produced. Upon continuing the hydrolysis until the reaction is substantially complete the water-insoluble polymers and copolymers of this invention are produced. When alkali metal hydroxides are used as hydrolysis catalysts, aqueous solutions comprising less than 20% alkali are preferred and aqueous solutions comprising 5 to 10% alkali are more preferred; however, the concentrations of such solutions may be varied to suit particular needs. Aqueous solutions comprising less than 20% alkali are especially advantageous in hydrolyzing the polyvinylene carbonate homopolymers because the substantially completely hydrolyzed product is insoluble in such solutions and its separation from the reaction medium is thus facilitated. Generally, when the above mentioned alkali metal hydroxides and alcoholates are used as hydrolysis catalysts, substantially complete hydrolysis will be brought about at room temperature in about one-half to two hours. With slight heating, the hydrolysis will be substantially complete in a few minutes.

When alkali metal alcoholates are used as catalysts, an excess of alcohol (based on the number of hydrolyzable groups in the polymer) is used to insure complete hydrolysis. The excess is preferably at least two to three fold; however, this may be varied to suit particular needs. As mentioned above, the hydrolysis may be carried out at room temperature or at elevated temperatures. The hydrolysis in the presence of alkali metal alcoholates may be followed by hydrolysis in the presence of aqueous alkali in order to insure complete hydrolysis.

The following nonlimiting example illustrates the preparation of a vinylene carbonate polymer and its hydrolysis to a water-insoluble polymer.

EXAMPLE 1

Vinylene carbonate monomer comprising 0.4%, by weight, of benzoyl peroxide was polymerized in bulk under nitrogen at 100° C.

The resulting polymer, upon being added to a 10% aqueous alkaline solution, was dissolved with the formation of a yellow colored solution. After slight warming, a water-insoluble polymer was formed and precipitated from the solution. The polymer was filtered and washed with water. A carbon-hydrogen analysis of the product showed the following:

|  | C | H |
|---|---|---|
| Found | 40.5% | 6.89% |
| Theoretical for $(CHOH)_n$ | 40.0% | 6.67% |

The polymer was insoluble in water, in dilute and concentrated mineral acids, and in diethylene triamine. It dissolved in hot 20% aqueous sodium hydroxide and in 35% aqueous benzyl trimethyl ammonium hydroxide. In infrared spectra of mineral oil mulls of (a) polyvinylene carbonate and (b) the above water-insoluble hydrolysis product, the former showed strong carbonyl absorption at 1825 cm.$^{-1}$ while the latter showed none.

The following nonlimiting example illustrates the preparation of a vinylene carbonate-vinyl acetate copolymer and its hydrolysis to a water-insoluble copolymer.

EXAMPLE 2

0.09 mole of vinylene carbonate and 0.01 mole of vinyl acetate were polymerized in a vacuum-sealed tube at 70° C. in the presence of 0.4% of benzoyl peroxide (based on weight of monomer) for 1½ hours (about 5% conversion). The polymer was precipitated by the addition of methanol and was filtered and washed with methanol. A carbon-hydrogen analysis showed the following results:

|  | Percent |
|---|---|
| Carbon | 47.3 |
| Hydrogen | 4.9 | which indicated that the copolymer comprised a mole fraction of vinylene carbonate of 0.61.

2 gms. of the above copolymer were dissolved in a dioxane solution which contained a small amount of γ-butyrolactone. Methanol was added till a slight turbidity appeared and then about 0.5 gm. of sodium methoxide, dissolved in methanol, was added. The solution was allowed to stand for about thirty minutes and then it was poured into methanol to precipitate the polymer. The polymer was filtered, washed with methanol and redissolved in 10% aqueous alkali. The aqueous alkali solution was warmed to insure complete hydrolysis of the polymer and then poured into methanol to bring about precipitation. The resulting polymer was filtered and washed with water. An infrared spectrum of the water-insoluble product showed that it was substantially completely hydrolyzed.

In the above example, a combination of hydrolyses was used in order to insure complete hydrolysis. It should be understood, however, that in most instances either type of hydrolysis could be used to bring about substantially complete hydrolysis.

It should be noted that when vinylene carbonate-vinyl acetate copolymers, which contain a predominance of vinyl acetate segments, are substantially completely hydrolyzed, the resulting hydrolysis products are water soluble. The lower limit on vinylene carbonate segments, which is necessary in order to produce water-insoluble polymers, was arrived at by polymerizing, in bulk, at 70° C., a series of copolymers containing varying amounts of vinylene carbonate, hydrolyzing the resulting polymers and checking their water solubilities. The results appear in tabular form below.

*Copolymerization of Vinyl Acetate ($M_1$) and Vinylene Carbonate ($M_2$)*

| Run | $M_2$ [1] | Reaction Time, minutes | Conversion | $m_2$ [1] | Water Solubility of Hydrolyzed Product |
|---|---|---|---|---|---|
| 1 | 0.101 | 15 | Approx. 5% | 0.028 | Soluble. |
| 2 | 0.303 | 15 | Approx. 5% | 0.093 | Do. |
| 3 | 0.505 | 25 | Approx. 5% | 0.20 | Do. |
| 4 | 0.724 | 35 | Approx. 5% | 0.30 | Somewhat Soluble. |
| 5 | 0.902 | 90 | Approx. 5% | 0.61 | Insoluble. |

[1] $M_2$ and $m_2$ represent the mole fractions of vinylene carbonate in the monomer mixture and copolymer, respectively.

$M_2$ was calculated from carbon-hydrogen analyses of the resulting copolymers.

It should be further noted that the phrase, "substantially completely hydrolyzed" which is used throughout this specification is intended to cover polymers which are 100% hydrolyzed and those which are substantially 100% hydrolyzed.

The polymers of this invention may be used to prepare acetals. Such acetals may be prepared by condensing the polymers of this invention with a suitable aldehyde such, for example, as benzaldehyde.

The polymers of this invention may be formed into films by procedures well known to the art. Such films may be used, for example, in photographic elements. The similarity in the solubility of the polymers of this invention and that of cellulose polymers suggests that the higher molecular weight polymers of this invention would be useful in the preparation of synthetic fibres.

Since certain changes may be made in the above product and process without departing from the scope of the invention herein involved, it is intended that all matter contained in the above description shall be interpreted as illustrative and not in a limiting sense.

What is claimed is:

A water-insoluble copolymer produced by hydrolyzing a vinyl acetate-vinylene carbonate copolymer until said copolymer is substantially free of unhydrolyzed groups, said vinyl acetate-vinylene carbonate copolymer comprising a mole fraction of vinylene carbonate segments of at least 0.6.

References Cited in the file of this patent

UNITED STATES PATENTS

| 2,847,401 | Gluesenkamp et al. | Aug. 12, 1958 |
| 2,847,402 | Gluesenkamp et al. | Aug. 12, 1958 |

OTHER REFERENCES

Du Pont: "Elvanol, Polyvinyl Alcohol," 43 pages (only pp. 36–37 presently relied upon), issued by E. I. du Pont Co., Wilmington 98, Delaware, third printing (1953).

Hayashi et al.: Journal of Polymer Science, vol. 27, January 1958, pp. 275–283.